US012615444B2

(12) United States Patent
Scheich

(10) Patent No.: US 12,615,444 B2
(45) Date of Patent: *Apr. 28, 2026

(54) PHOTOGRAPHIC PADDLE AND PROCESS OF USE THEREOF

(71) Applicant: Carvana, LLC, Tempe, AZ (US)

(72) Inventor: Davo Scheich, Troy, MI (US)

(73) Assignee: Carvana, LLC, Tempe, AZ (US)

( * ) Notice: Subject to any disclaimer, the term of this patent is extended or adjusted under 35 U.S.C. 154(b) by 188 days.

This patent is subject to a terminal disclaimer.

(21) Appl. No.: 18/619,816

(22) Filed: Mar. 28, 2024

(65) Prior Publication Data

US 2024/0267639 A1     Aug. 8, 2024

Related U.S. Application Data

(63) Continuation of application No. 17/604,515, filed as application No. PCT/US2020/028952 on Apr. 20, 2020, now Pat. No. 11,949,998.

(Continued)

(51) Int. Cl.
| | |
|---|---|
| *H04N 23/90* | (2023.01) |
| *G03B 17/56* | (2021.01) |

(Continued)

(52) U.S. Cl.
CPC ........... *H04N 23/90* (2023.01); *G03B 17/561* (2013.01); *G03B 17/563* (2013.01); *H04N 23/56* (2023.01); *H04N 23/71* (2023.01); *H04N 23/74* (2023.01)

(58) Field of Classification Search
CPC ........ H04N 23/13; H04N 23/15; H04N 23/45; H04N 23/50; H04N 23/54; H04N 23/56;

(Continued)

(56) References Cited

U.S. PATENT DOCUMENTS

| 967,025 A | 8/1910 | Leonard et al. |
|---|---|---|
| 4,545,630 A | 10/1985 | Izumi et al. |

(Continued)

FOREIGN PATENT DOCUMENTS

| CN | 201974618 U | 9/2011 |
|---|---|---|
| CN | 102902149 A | 1/2013 |

(Continued)

OTHER PUBLICATIONS

Variable Radius Camera Mount, International Search Report & Written Op, PCT/IB2016/000402, Mar. 18, 2015, 2 pages.

(Continued)

*Primary Examiner* — Daniel M Pasiewicz
(74) *Attorney, Agent, or Firm* — SNELL & WILMER L.L.P.

(57)     ABSTRACT

A photographic paddle and process of use thereof are provided. The photographic paddle is used for photographing interior or close-up vehicle exterior region features of a subject vehicle, and to rapidly produce high-quality images that are reflection-free and glare-free. The photographic paddle has the ability to produce wide-angle high-quality images and stereoscopic three-dimensional images that are reflection-free and glare-free. The photographic paddle has additional utility to photograph interior and close-up vehicle exterior region features of a subject vehicle in-situ in a densely arranged inventory lot without having to move the vehicle to and from a staging area. The photographic paddle has further utility as a versatile process that is able to rapidly adapt to changing photographic conditions as the photographic paddle moves relative to vehicle features to be photographed, ensuring capture and production of high-quality, reflection-free, and glare-free images without having to set the camera prior to each image capture.

20 Claims, 3 Drawing Sheets

Related U.S. Application Data

(60) Provisional application No. 62/836,383, filed on Apr. 19, 2019.

(51) Int. Cl.
| | |
|---|---|
| *H04N 23/56* | (2023.01) |
| *H04N 23/71* | (2023.01) |
| *H04N 23/74* | (2023.01) |

(58) Field of Classification Search
CPC ...... H04N 23/695; H04N 23/71; H04N 23/74; H04N 23/90; G03B 17/12; G03B 17/14; G03B 17/561; G03B 17/563
See application file for complete search history.

(56) References Cited

U.S. PATENT DOCUMENTS

| | | | |
|---|---|---|---|
| 4,804,983 A | | 2/1989 | Thayer |
| 4,855,770 A | | 8/1989 | Mauchan et al. |
| 4,918,321 A | | 4/1990 | Klenk et al. |
| 5,065,249 A | * | 11/1991 | Horn ...................... F16M 11/38 |
| | | | 386/362 |
| 5,436,726 A | | 7/1995 | Ventura et al. |
| 5,446,515 A | | 8/1995 | Wolfe et al. |
| 5,636,024 A | | 6/1997 | Crookham et al. |
| 5,657,073 A | | 8/1997 | Henley |
| 5,726,705 A | | 3/1998 | Imanishi et al. |
| 5,778,258 A | | 7/1998 | Zamoyski |
| 6,012,825 A | | 1/2000 | Horner et al. |
| 6,141,034 A | | 10/2000 | McCutchen |
| 6,144,809 A | | 11/2000 | Inaba |
| 6,147,752 A | | 11/2000 | Hewitt et al. |
| 6,266,138 B1 | | 7/2001 | Keshavmurthy |
| 6,320,654 B1 | | 11/2001 | Alders et al. |
| 6,513,941 B1 | | 2/2003 | Perrier et al. |
| 6,778,097 B1 | | 8/2004 | Kajita et al. |
| 6,901,384 B2 | | 5/2005 | Lynch et al. |
| 6,950,807 B2 | | 9/2005 | Brock |
| 7,212,308 B2 | | 5/2007 | Morgan |
| 7,954,953 B2 | | 6/2011 | Sprague |
| 8,050,735 B2 | | 11/2011 | Feke et al. |
| 8,112,325 B2 | | 2/2012 | Foy et al. |
| 8,155,432 B2 | | 4/2012 | Ueno |
| 9,037,968 B1 | | 5/2015 | Pringle et al. |
| 9,046,740 B1 | | 6/2015 | Smithweck |
| 9,113,784 B2 | | 8/2015 | Feke et al. |
| 9,172,903 B1 | | 10/2015 | Englander et al. |
| 9,302,190 B1 | | 4/2016 | Jennings |
| 9,412,203 B1 | | 8/2016 | Garcia et al. |
| 9,429,817 B1 | | 8/2016 | Harder et al. |
| 9,644,946 B1 | * | 5/2017 | LeBlanc ................ G01N 21/00 |
| 10,021,315 B1 | | 7/2018 | Colburn et al. |
| 10,063,758 B2 | | 8/2018 | Scheich |
| 10,260,672 B2 | * | 4/2019 | Martini .................. F16M 11/10 |
| 10,311,636 B1 | | 6/2019 | Falstrup et al. |
| 10,814,800 B1 | | 10/2020 | Gould |
| 10,824,055 B1 | | 11/2020 | Mcguire et al. |
| 11,412,135 B2 | | 8/2022 | Scheich |
| 11,720,005 B2 | | 8/2023 | Scheich |
| 11,949,998 B2 | * | 4/2024 | Scheich .............. G03B 17/561 |
| 2001/0020933 A1 | | 9/2001 | Maggioni |
| 2002/0082860 A1 | | 6/2002 | Johnson |
| 2002/0085219 A1 | | 7/2002 | Ramamoorthy |
| 2002/0105513 A1 | | 8/2002 | Chen |
| 2002/0145660 A1 | | 10/2002 | Kanade et al. |
| 2003/0107568 A1 | | 6/2003 | Urisaka et al. |
| 2004/0036841 A1 | | 2/2004 | Dbjay |
| 2004/0078298 A1 | | 4/2004 | Fusama |
| 2005/0231388 A1 | | 10/2005 | Suggs |
| 2006/0114531 A1 | | 6/2006 | Webb et al. |
| 2006/0182308 A1 | | 8/2006 | Gerlach et al. |
| 2006/0185550 A1 | | 8/2006 | Zanzucchi et al. |
| 2006/0256959 A1 | | 11/2006 | Hymes |
| 2006/0285836 A1 | | 12/2006 | Coppola |

| | | | |
|---|---|---|---|
| 2007/0011083 A1 | | 1/2007 | Bird et al. |
| 2007/0035539 A1 | | 2/2007 | Matsumura et al. |
| 2007/0057815 A1 | | 3/2007 | Foy et al. |
| 2007/0172216 A1 | | 7/2007 | Lai |
| 2007/0211240 A1 | | 9/2007 | Matsumoto et al. |
| 2007/0230824 A1 | | 10/2007 | Alvarez |
| 2008/0106593 A1 | | 5/2008 | Arfvidsson et al. |
| 2008/0187182 A1 | | 8/2008 | Abe |
| 2008/0250585 A1 | | 10/2008 | Auer et al. |
| 2009/0043206 A1 | | 2/2009 | Towfiq et al. |
| 2009/0160930 A1 | | 6/2009 | Ruppert |
| 2010/0067801 A1 | | 3/2010 | Van Den et al. |
| 2010/0238290 A1 | | 9/2010 | Riley et al. |
| 2010/0258694 A1 | | 10/2010 | Steger |
| 2010/0306413 A1 | | 12/2010 | Kamay |
| 2011/0080487 A1 | | 4/2011 | Venkataraman et al. |
| 2011/0102744 A1 | | 5/2011 | Saad |
| 2011/0134260 A1 | | 6/2011 | Cho |
| 2011/0221904 A1 | | 9/2011 | Swinford |
| 2011/0249100 A1 | | 10/2011 | Jayaram et al. |
| 2012/0087643 A1 | | 4/2012 | Paramadilok |
| 2012/0092493 A1 | | 4/2012 | Tsutsui et al. |
| 2013/0038991 A1 | | 2/2013 | Fang et al. |
| 2013/0057678 A1 | | 3/2013 | Prior et al. |
| 2013/0107041 A1 | | 5/2013 | Norem et al. |
| 2013/0197852 A1 | | 8/2013 | Grau et al. |
| 2013/0229512 A1 | | 9/2013 | Steffey et al. |
| 2014/0009275 A1 | | 1/2014 | Bowers et al. |
| 2014/0118807 A1 | | 5/2014 | Su |
| 2014/0152806 A1 | | 6/2014 | Hauk |
| 2014/0153916 A1 | | 6/2014 | Kintner |
| 2014/0192181 A1 | | 7/2014 | Taylor et al. |
| 2014/0235362 A1 | | 8/2014 | Fox et al. |
| 2014/0268627 A1 | | 9/2014 | Contreras et al. |
| 2014/0362176 A1 | | 12/2014 | St Clair |
| 2015/0012168 A1 | | 1/2015 | Kuklish et al. |
| 2015/0077564 A1 | | 3/2015 | Swindord |
| 2015/0111601 A1 | | 4/2015 | Fagan |
| 2015/0181089 A1 | | 6/2015 | Mirlay |
| 2015/0326764 A1 | * | 11/2015 | Roshanravan ......... F16M 13/00 |
| | | | 348/373 |
| 2016/0001184 A1 | | 1/2016 | Sepulveda et al. |
| 2016/0029008 A1 | | 1/2016 | Prechtl |
| 2016/0381323 A1 | | 12/2016 | Garcia et al. |
| 2017/0051547 A1 | | 2/2017 | Albrecht |
| 2017/0104924 A1 | | 4/2017 | Holz |
| 2017/0148102 A1 | | 5/2017 | Franke et al. |
| 2017/0180696 A1 | | 6/2017 | Broughton |
| 2017/0234669 A1 | | 8/2017 | Grau et al. |
| 2017/0264936 A1 | | 9/2017 | Depies et al. |
| 2017/0291548 A1 | | 10/2017 | Kim et al. |
| 2017/0353658 A1 | | 12/2017 | Colin |
| 2018/0084224 A1 | | 3/2018 | Mcnelley et al. |
| 2018/0160019 A1 | | 6/2018 | Scheich |
| 2019/0011806 A1 | | 1/2019 | Zilban et al. |
| 2019/0056483 A1 | | 2/2019 | Bradley et al. |
| 2019/0220999 A1 | | 7/2019 | Miyagaki et al. |
| 2019/0235737 A1 | | 8/2019 | Kuribayashi |
| 2019/0244336 A1 | | 8/2019 | Wakisaka et al. |
| 2019/0253701 A1 | | 8/2019 | Himel et al. |
| 2020/0173930 A1 | | 6/2020 | Alonie et al. |
| 2022/0060633 A1 | | 2/2022 | Dillow |
| 2022/0101558 A1 | | 3/2022 | Mahajan et al. |
| 2022/0311919 A1 | | 9/2022 | Scheich |
| 2022/0405519 A1 | | 12/2022 | Guzik et al. |
| 2023/0007934 A1 | | 1/2023 | Swinford |

FOREIGN PATENT DOCUMENTS

| | | |
|---|---|---|
| CN | 103950032 A | 7/2014 |
| CN | 104094081 A | 10/2014 |
| CN | 104320566 A | 1/2015 |
| CN | 207301580 U | 5/2018 |
| CN | 207560161 U | 6/2018 |
| DE | 19852348 A1 | 5/2000 |
| DE | 202017002782 U1 | 6/2017 |
| JP | S56132509 A | 10/1981 |
| JP | H10223040 A | 8/1998 |
| JP | 2001013578 A | 1/2001 |

(56)          References Cited

FOREIGN PATENT DOCUMENTS

| | | | |
|---|---|---|---|
| JP | 2003177460 | A | 6/2003 |
| JP | 4406937 | B2 | 2/2010 |
| TW | M489305 | U | 11/2014 |
| WO | 2014046968 | A1 | 3/2014 |
| WO | 2018062242 | A1 | 4/2018 |

OTHER PUBLICATIONS

In Re Venner et al., No. 6391, LexisNexis; United States Court of Customs and Patent Appeals; Oral argument Nov. 7, 1958, Dec. 19, 1958.
Credit Acceptance Corp, Guaranteed Credit Approval, Auto Loan; http://www.insider-car-buying-tips.com/credit_acceptance_corp. html; accessed Dec. 17, 2013.
Auto Success; Credit Acceptance's Upgraded Credit Approval Processing System Simplifies Approval Process; vol. 1 Issue 33; http://www.imakenews.com/autosuccess/e_article001075242.cfm? x=bgB6V1j,b7jJcq29,w; accessed Dec. 17, 2013.
Credit Acceptance Corp (CACC.OQ) Company Profile I Reuters. com; http://www.reuters.com/finance/stocks/companyProfile?symbol= CACC.OQ; accessed Dec. 17, 2013.
Credit Acceptance Corporation—Annual Report; United States Securities and Exchange Commission; Washington D.C. 20549; Form 10-K; Annual Report Pursuant to Section 13 or 15(d) of the Securities Exchange Act of 1934. http://www.ir.creditacceptance. com/secfiling.cfm?filing1 D=885550-13-18&CIK=885550; accessed Dec. 17, 2013.

* cited by examiner

PHOTOGRAPHIC PADDLE AND PROCESS OF USE THEREOF

CROSS-REFERENCE TO RELATED APPLICATIONS

This application is a continuation of U.S. application Ser. No. 17/604,515, entitled PHOTOGRAPHIC PADDLE AND PROCESS OF USE THEREOF and filed Oct. 18, 2021. U.S. application Ser. No. 17/604,515 is a national stage entry of PCT Number PCT/US2020/028952, entitled PHOTO-GRAPHIC PADDLE AND PROCESS OF USE THEREOF and filed Apr. 20, 2020. PCT Number PCT/US2020/02895 claims the benefit of U.S. Provisional Application No. 62/836,383, entitled PHOTOGRAPHIC PADDLE AND PROCESS OF USE THEREOF and filed Apr. 19, 2019. These applications are incorporated by this reference in their entirety.

FIELD OF THE INVENTION

The present invention in general relates to vehicle photography; and in particular, to a photographic paddle and process of use thereof where a series of images of a vehicle interior or close-up vehicle exterior region features are captured and blended into a single image that is reflection-free and glare-free.

BACKGROUND OF THE INVENTION

Shopping for a vehicle online has been growing in popularity and plays a major role in the vehicle sales market. As a result of this trend, sellers typically post photos of vehicles in their inventory online in an effort to attract buyers. In the physical vehicle dealership market, it is becoming increasingly rare for a buyer to arrive at the dealership ready to purchase a vehicle without first performing an online search of the dealership's inventory. This initial online search is often what motivates a buyer to travel to the dealership to further pursue a vehicle purchase. Thus, in order to thrive in the present vehicle sales market, it has become increasingly important for sellers to produce many high-quality images of all vehicles in the inventory. These high-quality images usually include multiple perspectives of both the interior and exterior features of the vehicle.

Online auto auctions have also been growing in popularity. One of the most popular online auctions to buy vehicles from is EBAY®. On EBAY® Motors™, a user can create an account and put their vehicles up for auction. Other popular websites include Cars.com™ and Autotrader.com™. Typically, online vehicle sales are based solely on images of the vehicle, since the buyer is in a remote location and is usually unable to view the vehicle in question in person. Thus, as is the case for vehicle sales from a physical dealership, many high-quality images are required of the vehicle's interior and exterior features, from multiple perspectives, to allow a buyer to gain an understanding of a subject vehicle's condition and appearance. These high-quality images are an important factor directly linked to the ultimate success of a seller in the present vehicle sales market.

High-quality vehicle image capture also allows for the processing of vehicles for car condition assessments for rental agencies, fleet management companies, public safety agencies, municipal and government agencies, insurance companies, etc.

Producing high-quality vehicle images from multiple perspectives is time consuming. A photographer has to stage the subject vehicle, physically move around the subject vehicle, open and close the doors, trunk or liftgate, and hood of the subject vehicle, and maneuver the camera in tight spaces within the interior of the vehicle, all while stopping in many intervals to set the camera and capture images throughout this process.

This problem is amplified in the case of a dealer with a large inventory of vehicles for sale. Dealers often tightly arrange their vehicle inventory into dense configurations on the dealership lot due to limitations on space or in order to maximize the number of vehicles offered for sale at any given time. This arrangement precludes the ability to produce high-quality vehicle images from multiple perspectives with the vehicles in-situ. As a result, many dealerships often require a dedicated employee to move a subject vehicle to be photographed from its position on the lot to a staging area away from the rest of the inventory. Then the vehicle photographing process described hereinabove is performed. Once this process in finished, the employee must return the vehicle to its original position on the lot amongst the rest of the inventory. This process must be repeated for each and every vehicle in the inventory. This process represents a labor intensive and time-consuming task and becomes an increasingly significant drain on resources for dealerships with larger inventories.

Further amplifying the aforementioned obstacles to generation of high-quality vehicle images is the need for acceptable lighting conditions. Vehicle images are particularly hard to obtain without unwanted reflections of the photographer or the surroundings and without glare from the sun or other light sources. However, reflection-free and glare-free images are critical to be able to discern surface imperfections, scratches, and dents on a vehicle surface. Thus, high-quality reflection-free and glare-free images are more likely to attract potential buyers who can be confident that the images they are relying on provide an accurate portrayal of the condition of the vehicle. As such, vehicles can often only be photographed during a small portion of the day when ambient lighting conditions in the dedicated staging area are such that glare and reflection are minimized and high-quality images can be produced. Further exacerbating this problem is the fact that multiple perspectives of various vehicle features are required. As such, the potential for glare and reflection is variable as a photographer moves around a subject vehicle. This problem can be more acute when photographing interior features of a subject vehicle. Vehicle interiors can feature abrupt shifts in surface materials and surface angles from one feature to the next. For example, a vehicle dashboard often includes a high-sheen surface that can reflect or defract light at multiple angles resulting in a distorted and low-quality image replete with unwanted reflections and glare. Wide-angle high-quality images of a vehicle interior are also difficult to achieve owing to the compact space and short distance between the camera and interior feature to be photographed. As a result, many images of various interior vehicle features are required to provide a buyer with a complete understanding of the conditions of the various interior features, and thus do not provide a potential buyer a wide-angle view of multiple interior vehicle features in a single image.

Furthermore, the photographer also has to manually collate the images, name and upload the files, and if required, perform image stitching or otherwise further process and edit the images until they are in acceptable form as high-quality images ready to be posted online.

While prior art solutions can produce high-quality vehicle images, they tend to be characterized as too time-consuming and labor intensive to be amenable to the high throughput required for higher volume vehicle sales, and particularly in the case of a large inventory densely arranged on a dealership lot.

Thus, there is a need to be able to rapidly capture and produce high-quality, reflection-free, and glare-free images of the exterior and interior features of a subject vehicle from multiple perspectives. There is a further need to be able to rapidly capture and produce the aforementioned high-quality, reflection-free, and glare-free images from a subject vehicle in-situ on a dealership lot, thus dispensing with the need to move each subject vehicle to and from a staging area.

SUMMARY OF THE INVENTION

A photographic paddle is provided for creation of interior photographs of a vehicle. The photographic paddle includes a track on a face of the photographic paddle, a first wing and a second wing joined to the track, at least two cameras mounted, each independently to the first wing, the second wing, or the track, and at least two light sources positioned each independently on the track, the face, one of the at least two cameras, the first wing, or the second wing. The photographic paddle further includes a reader adapted to identify a set of vehicle-specific information and positioned on the track, the first wing, the second wing, or one of the at least two cameras, a shutter release adapted to initiate capture of a plurality of images, and a power supply electrically coupled to at least one of the track, at least one of the at least two cameras, the first wing, the second wing, at least one of the at least two light sources, and combinations thereof.

A process is provided for photographing an interior of a vehicle with the disclosed photographic paddle. The process includes reading a VIN or dealer stock number using the photographic paddle, accessing a set of vehicle-specific information associated with the VIN or the dealer stock number, the set of vehicle-specific information including at least one of vehicle make, model, year, body style, trim, exterior vehicle color, interior vehicle color scheme, interior vehicle material scheme, and combinations thereof, and actuating the shutter release initiating the capture of a plurality of images of a vehicle feature.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1:
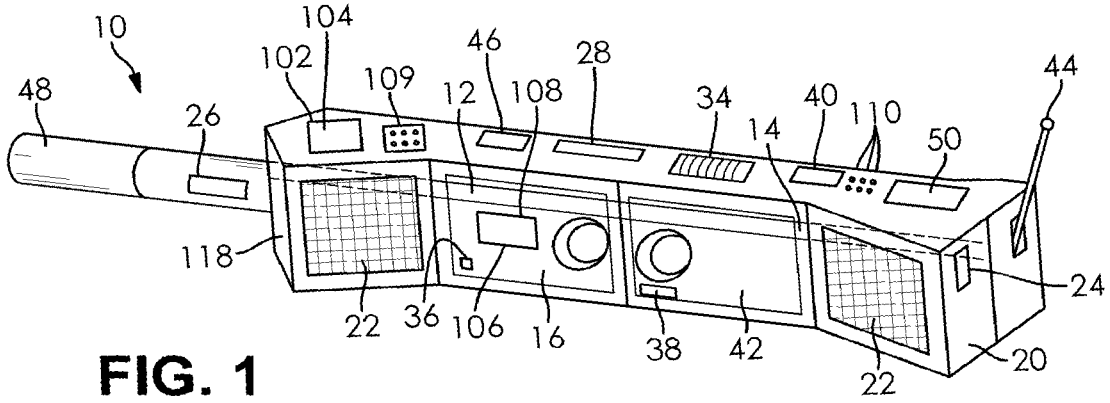
FIG. 1 is a perspective view of the photographic paddle in accordance with an embodiment of the invention.

An inventive photographic paddle and process of use thereof are provided. The present invention has utility as a process for photographing interior or close-up vehicle exterior region features of a subject vehicle using the inventive photographic paddle to rapidly produce high-quality images that are reflection-free and glare-free. The present invention also has utility to produce wide-angle high-quality images that are reflection-free and glare-free. The present invention has additional utility to photograph interior and close-up vehicle exterior region features of a subject vehicle in-situ in a densely arranged inventory lot without having to move the subject vehicle to and from a staging area. The present invention has further utility as a versatile process that is able to rapidly adapt to changing photographic conditions as the photographic paddle moves relative to vehicle features to be photographed, ensuring capture and production of high-quality, reflection-free, and glare-free images without having to set the camera prior to each image capture. The present invention has still further utility to produce stereoscopic three-dimensional images of interior features and close-up exterior region features of a subject vehicle.

The more important features of the invention have thus been outlined in order that the more detailed description that follows may be better understood and in order that the present contribution to the art may better be appreciated. Additional features of the invention will be described hereinafter and will form the subject matter of the claims that follow.

Many attributes of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is to be understood that in instances where a range of values are provided herein, that the range is intended to encompass not only the end point values of the range, but also intermediate values of the range as explicitly being included within the range and varying by the last significant figure of the range. By way of example, a recited range of from 1 to 4 is intended to include 1-2, 1-3, 2-4, 3-4, and 1-4.

The present invention represents a departure from the prior art in that the inventive process for photographing interior and exterior features of a subject vehicle using the inventive photographic paddle allows for the rapid capture and production of high-quality, reflection-free, and glare-free vehicle images. The throughput capabilities of the present invention arc significantly faster and more efficient than the prior art and are achieved without degradation to image quality. To the contrary, image quality of images produced by the present invention are superior to the prior art in at least that high-quality wide-angle photographs can be produced with minimal distortion and are free from unwanted reflections and glare. The present invention further represents a departure from the prior art in that the inventive photographic paddle is modular and thus is extremely versatile and able to rapidly adapt to constantly changing photographic conditions in order to ensure production of the highest-quality image. As described in further detail hereinbelow, elements of the inventive photographic paddle are independently adjustable allowing for a variety of orientations and configurations of the elements relative to one another, the photographic paddle, and the vehicle feature to be photographed. This flexibility allows for the capture and production of high-quality, reflection-free, and glare-free images as various photographic conditions change as the photographer moves the inventive photographic paddle in and around a subject vehicle during the inventive photographing process.

Referring now to the figures, FIG. 1 is a perspective view of the inventive photographic paddle shown generally at 10. A track 12 is attached on a face 14 of the photographic paddle 10. A first wing 18 and a second wing 20 are joined to the track 12. At least two cameras 16 are each independently mounted to said first wing 18, said second wing 20, or said track 12. At least two light sources 22 are each independently positioned on the track 12, one of the at least two cameras 16, the first wing 18, or the second wing 20. In some inventive embodiments, the at least two cameras 16, the first wing 18, the second wing 20, and each of the at least two light sources 22 are independently oriented relative to the track 12. It is appreciated that in some inventive embodiments, at least one of the at least two cameras 16, the first wing 18, the second wing 20, the at least two light sources 22, and combinations thereof are slideable along said track 12. It is further appreciated that in other inventive embodiments, at least one of the at least two cameras 16, the first wing 18, the second wing 20, the at least two light sources 22, and combinations thereof are mounted on a telescoping arm (not pictured) joined to the track 12. In certain inventive embodiments, an angle, a of the first wing 18 relative to the track 12 and an angle, a' of the second wing 20 relative to the track are independently adjustable. In other inventive embodiments, at least one of the first wing 18, the second wing 20, and combinations thereof are independently adjusted to an angle of between 30 and 60 degrees relative to the track 12. In some inventive embodiments, the first wing 18 is positioned on a first end of the track 12, the second wing 20 is positioned on an opposing second end of the track 12 relative to the first end, and the at least two cameras 16 are positioned on the track 12 in between the first wing 18 and the second wing 20. A reader 24 adapted to identify a set of vehicle-specific information is positioned on the track 12, the first wing 18, the second wing 20, or one of the at least two cameras 16. It is appreciated that the reader 24 is at least one of a radio frequency identification (RFID) reader, a QR code reader, an alphanumeric reader, a bar code reader, and combinations thereof. It is further appreciated that a VIN or dealer stock number 62 (see FIGS. 3-5) may be encoded in an RFID tag, a QR code, or a bar code. In certain inventive embodiments, the VIN or dealer stock number 62 is identified by the reader 24 allowing access to the set of vehicle-specific information associated with the VIN or dealer stock number. It is appreciated that the set of vehicle-specific information associated with the VIN or dealer stock number 62 illustratively includes at least one of vehicle make, model, year, body style, trim, exterior vehicle color, interior vehicle color and material scheme, and combinations thereof. It is further appreciated that in some inventive embodiments, further information that may be related to the VIN or dealer stock number 62 read by the reader 24 includes a dealership setting that may also indicate which dealer the vehicle is being photographed for, and may also illustratively incorporate that dealer's specific preferences such as lighting style, file size and format, and number of vehicle images desired. It is still further appreciated that in other inventive embodiments, the VIN or dealer stock number 62 read by the reader 24 is also used in some inventive embodiments to project text relevant to the specific vehicle associated with the VIN or dealer stock number 62 onto the background of various images, or to overlay text onto the image during processing as shown at 64 in FIG. 5; the text illustratively including price, dealer name, vehicle specifications, mileage, etc. In some inventive embodiments, the resulting high-quality image 66 is automatically associated with the vehicle associated with the VIN or dealer stock number 62 read by the reader 24, the high-quality image 66 or multiple such images being collected by the paddle 10. It is appreciated that this automatic association of resulting high-quality image 66 with VIN or dealer stock number 62 further speeds up image production and vehicle processing time as the high-quality images can be automatically uploaded to the online listing of the vehicle associated with that VIN or dealer stock number 62 by way of a computer display 68 associated with a processing computer. It is appreciated that a graphical user interface is provided to allow for user modification of images, alphanumerical data overlaid thereon, or a combination thereof. It is further appreciated the rapid image capture and vehicle processing time afforded by the present invention allows for new business models such as creating virtual or cyber dealerships where a wholesale customer never takes possession of a subject vehicle, and the vehicle is dropped shipped to the end retail consumer. Photographs produced with the present invention may be sold along with the subject vehicle for use by a purchasing car retailer.

A shutter release 26 adapted, upon actuation, to initiate capture of one or more images of a subject vehicle is also provided. In some inventive embodiments, a photographer actuates the shutter release 26 by tapping a touch-sensitive portion 46 of the inventive photographic paddle 10. In other inventive embodiments, a photographer actuates the shutter release remotely and wirelessly via a communication interface 44. In other inventive embodiments, a handle 48 extends from the face 14 of the photographic paddle 10. In still other inventive embodiments, the shutter release 26 is a physical button embedded within the handle 48 and protruding therefrom. A power supply 28 is electrically coupled to at least one of the track 12, the at least one of said at least two cameras 16, the first wing 18, the second wing 20, at least one of the at least two light sources 22, or combinations thereof.

Figure 2:
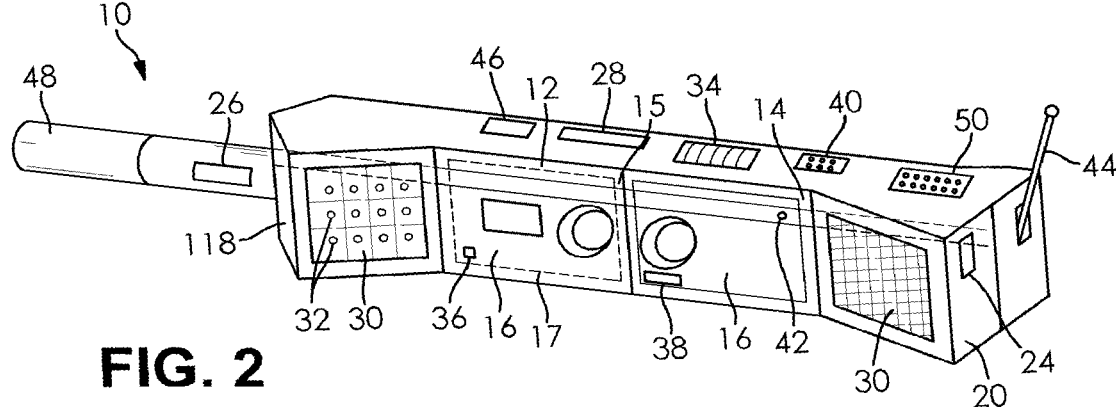
FIG. 2 is a perspective view of the photographic paddle showing the at least two light sources as at least two light arrays and showing at least one of the two light arrays having a plurality of multicolored lights in accordance with another embodiment of the invention.

As shown in in FIG. 2, in which like reference numerals have the meanings attributed thereto with respect to FIG. 1, a paddle 10' is provided in which the at least two light sources 22 are at least two light arrays 30. As shown in this embodiment, a first of said at least two light arrays 30 is positioned on the first wing 18 and a second of said at least two light arrays 30 is positioned on the second wing 20. It is appreciated that at least one of the at least two light arrays 30 in some inventive embodiments has a plurality of multicolored lights 32. It is further appreciated that the plurality of multicolored lights 32 in some inventive embodiments are polarized. It is still further appreciated that in some inventive embodiments the lens 15 of at least one of the at least two cameras 16 is polarized. In still other inventive embodiments, a motor 34 is electrically coupled to the power supply 28 and mechanically coupled to at least one of the track 12, at least one of the at least two cameras 16, the first wing 18, the second wing 20, at least one of the at least two light sources 22, and combinations thereof. It is appreciated that the motor 34 in some inventive embodiments mechanically drives a positional adjustment to at least one of the track 12, at least one of the at least two cameras 16, the first wing 18, the second wing 20, at least one of the at least two light sources 22, and combinations thereof. In certain inventive embodiments, a sensor 36 is positioned on the track 12, the first wing 18, the second wing 20, or one of the at least two cameras 16. It is appreciated that the sensor 36 is adapted to generate a set of ambient lighting conditions data. It is further appreciated that in some inventive embodiments the set of ambient lighting conditions data is used to adjust lighting during actuation of the shutter release 26. In other inventive embodiments, a distance detector 38 is positioned on the track 12, the first wing 18, the second wing 20, or one of the at least two cameras 16. It is appreciated that the distance detector 38 is adapted to generate a set of distance data relative to a distance between the photographic paddle 10 or 10' and the vehicle feature to be photographed. In certain inventive embodiments the distance detector 38 is a Light Detection and Ranging (LiDAR) device. In other inventive embodiments a central processing unit (CPU) 40 is provided. It is appreciated that the CPU 40 is in communication with at least one of the motor 34, the sensor 36, at least one of the at least two cameras 16, at least one of the at least two light sources 22, the distance detector 38, and combinations thereof. It is further appreciated that in some inventive embodiments the CPU 40 coordinates and controls the overall movement and various orientations and configurations of the modular elements of the inventive photographic paddle 10 or 10'. In some inventive embodiments, an alphanumeric keypad 50 is positioned on the photographic paddle 10 or 10'. It is appreciated that the alphanumeric keypad 50 is adapted to receive manual input of the VIN or the dealer stock number 62.

In some inventive embodiments, high-quality, reflection-free, and glare-free images are automatically processed and generated by the inventive photographic paddle 10 or 10'. Referring back to FIG. 1, A bus 102 links various components of the on-board processing system. Memory 104 serves as storage for operating programs and firmware for the on-board processing system. A database with vehicle-specific and client information is stored in memory 104. Memory is made up of read-only memory (ROM) and random access memory (RAM). In some inventive embodiments, the inventive photo paddle 10 or 10' has a display 106 driven by a graphics chipset 108. It is appreciated that the display 106 may be liquid crystal display (LCD), light emitting diode (LED), or other known display technologies. In certain inventive embodiments, the inventive photographic paddle 10 or 10' has a control interface 109 that may include knobs, buttons, and other touch sensitive controls for selecting various menu items, modular configurations of the elements of the photographic paddle, entering alphanumeric information, etc. Indicators 110 provide visual feedback for users of the inventive photographic paddle 10 or 10'.

Referring back to FIG. 2, in some inventive embodiments at least one of said at least two cameras 16 is connected to a flexible accordion extension 17 that is connected to the track 12. It is appreciated that the flexible accordion extension allows the at least one of said at least two cameras 16 to pan and tilt. It is further appreciated that the flexible accordion extension may be locked into various positions and orientations relative to each image capture. In some inventive embodiments, the flexible accordion extension is mechanically coupled to the motor 34.

Figure 3:
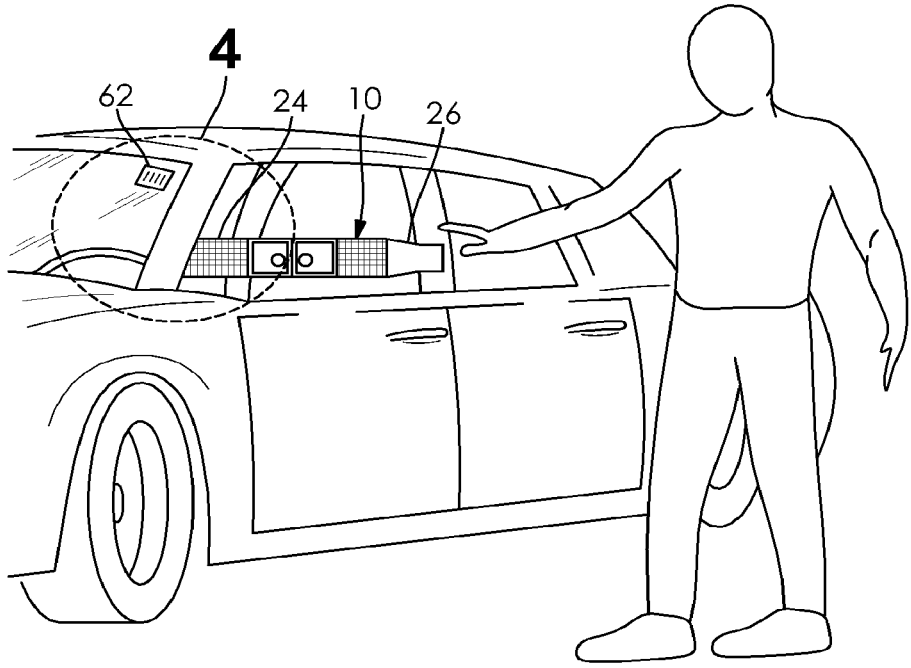
FIG. 3. is a perspective view of an inventive photographic paddle with an optional handle in the use context of a vehicle interior.
Figure 4:
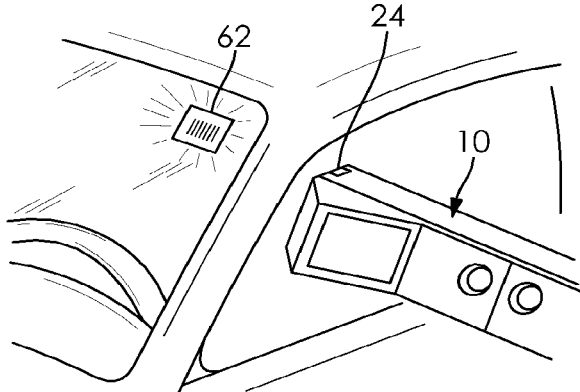
FIG. 4 is magnified version of a portion of FIG. 3 as delineated by the circle shown therein.
Figure 5:
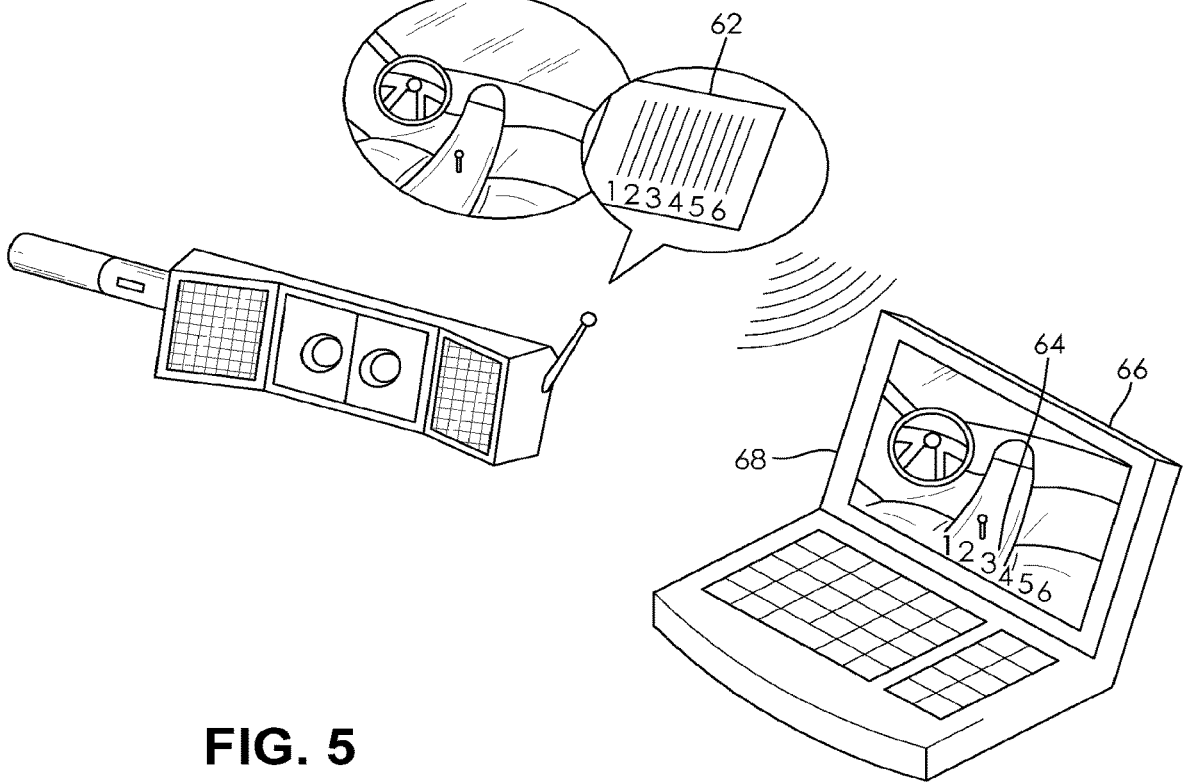
FIG. 5 is a schematic showing the transfer of images and vehicle identification from an inventive photographic paddle to a computer with a display and a graphical user interface for subsequent manipulation and association with sales materials for the vehicle.

The inventive photographic paddle 10 or 10' is used in the inventive process for photographing an interior or close-up exterior region features of a vehicle as shown in FIGS. 3 and 4. Close-up exterior region features of a vehicle illustratively include wheel rims, decals, and badging. In some inventive embodiments, a photographer approaches a subject vehicle and reads the VIN or dealer stock number 62 with the reader 24 allowing access to the set of vehicle-specific information associated with the VIN or dealer stock number 62. When photographic interior features of the subject vehicle, the photographic paddle 10 or 10' is then inserted into the interior of the subject vehicle and the shutter release 26 is actuated initiating the capture of a images of the interior of the subject vehicle. In certain inventive embodiments, the photographic paddle 10 or 10' is inserted into the interior of the subject vehicle through an open window or an open door of the subject vehicle. When photographing close-up exterior region features of a vehicle, the photographic paddle 10 or 10' is oriented by the photographer as desired and the shutter release 26 is actuated initiating the capture of images of the exterior region to be photographed. It is appreciated that in some inventive embodiments, the images captured are automatically associated with the subject vehicle via the VIN or dealer stock number 62 read by the reader 24 as shown in FIG. 5.

As described hereinabove, it is appreciated that the present invention represents improvements over the prior art. By way of non-limiting example, the inventive process for photographing vehicle features using the inventive photographic paddle 10 or 10' allows for the rapid capture and production of high-quality, reflection-free, and glare-free vehicle images with a significant increase in throughput and vehicle processing. Owing to the modular design of the inventive photographic paddle 10 or 10', elements such as the at least two cameras 16, the first wing 18, the second wing 20, and the at least two light sources 22 are each independently adjustable. This versatility allows for a variety of orientations and configurations of the elements relative the track 12 of the photographic paddle 10 or 10' and relative to the vehicle feature to be photographed. Thus, the modular elements of the inventive photographic paddle 10 or 10' are able to rapidly adjust to constantly changing photographic conditions as the photographer moves in and around the vehicle during the inventive photographic process in order to ensure the capture and production of high-quality, reflection-free, and glare-free images. In some inventive embodiments, specific orientations and configurations of the modular elements of the photographic paddle 10 or 10' automatically adjust position relative to the inventive photographic paddle 10 or 10' and to the vehicle feature to be photographed.

It is appreciated that in some inventive embodiments, the at least two light sources 22 illustratively include light-emitting diode (LED), fluorescent bulb, compact fluorescent bulb, incandescent bulb, halogen bulb, high-intensity discharge bulb, and combinations thereof. In certain inventive embodiments, the at least two light sources 22 are at least two light arrays 30. In some inventive embodiments, the at least two light arrays are embedded into the face 14. In other inventive embodiments, the at least two light arrays 30 include a plurality of multicolored lights 32 offering even more flexibility to accommodate changing photographic conditions during the inventive process. It is appreciated that in some inventive embodiments, each of the plurality of multicolored lights 32 are polarized. It is further appreciated that the plurality of multicolored lights 32 provide granular tunability relative to changing ambient lighting conditions during the photographic process. By way of nonlimiting example, the plurality of multicolored lights 32 can be adjusted to fire in specific color schemes, geometric orientations, quick pulse, long pulse, strobe, traditional camera flash, and combinations thereof. It is appreciated that the plurality of multicolored lights 32 are tuned to ensure achievement of high-quality, reflection-free, and glare free images relative to variable photographic conditions present throughout the inventive photographic process.

In some embodiments, at least one of the following elements is manually or automatically adjusted prior to, or simultaneously with, actuating said shutter release 26: the angle of the first wing 18, the angle of the second wing 20, the position of the first wing 18 on the track 12, the position of the second wing 20 on the track 12, the position of each of the at least two cameras 16 on the track 12, the zoom of each of the at least two cameras 16, the position and angle of each of the two light sources 22 relative to the track 12, a total number of lights fired 32 per image capture, a color scheme of the total number of lights 32 fired per image capture, the geometric configuration of the total number of lights 32 fired per image capture, the timing of the firing of the at least two light sources 22 relative to each image capture, a total number of the at least two light sources 22 to be fired with each image capture, the total number of images to be captured, a time interval between each image capture, and combinations thereof. In other inventive embodiments, at least one of the following elements is manually or automatically adjusted between each image capture: the angle of the first wing 18, the angle of the second wing 20, the position of the first wing 18 on the track 12, the position of the second wing 20 on the track 12, the position of each of the at least two cameras 16 on the track 12, the zoom of each of the at least two cameras 16, the position and angle of each of the two light sources 22 relative to the track 12, a total number of lights fired 32, a color scheme of the total number of lights 32 fired, the geometric configuration of the total number of lights 32 fired, the timing of the firing of the at least two light sources 22, a total number of the at least two light sources 22 to be fired, the total number of images to be captured, a time interval between each image capture, and combinations thereof. In certain inventive embodiments, the aforementioned elements are manually or automatically adjusted based on at least one of the following: the set of vehicle-specific information, the set of ambient lighting conditions data, the set of distance data, the set of image data from at least one of the plurality of images captured, and combinations thereof.

In some inventive embodiments, the set of image data from the plurality of images captured are composited into a single high-quality image that is reflection-free and glare-free. In certain inventive embodiments, a predetermined percentage of each of the plurality of images captured are blended into a single high-quality image that is reflection-free and glare-free. It is appreciated that in some inventive embodiments the predetermined blending percentage is fixed based on at least one of the set of vehicle-specific information, the set of ambient lighting conditions data, the set of distance data, and combinations thereof. In other inventive embodiments, a blend of each of the plurality of images captured is filtered into a single high-quality image that is reflection-free and glare-free based on at least one of the set of vehicle-specific information, the set of ambient lighting conditions data, the set of distance data, the set of image data from the plurality of images captured, and combinations thereof. It is appreciated that in certain inventive embodiments each of the plurality of images captured are analyzed, filtered, and blended by a stitching program. It is further appreciated that the stitching program in some inventive embodiments is part of the on-board processing system of the inventive photographic paddle 10 or 10'. It is still further appreciated that the stitching program in some inventive embodiments allows a user to set various blending and filtering preferences and thresholds illustratively including the retaining, in the final high-quality image, a percentage of reflection or glare captured in the raw image data, thereby shaping the vehicle feature photographed, which is then perceived by the viewer as a desirable highlight of the vehicle feature photographed. In still other inventive embodiments, the set of image data from the plurality of images is further tuned based on a set of accelerometer data generated by an accelerometer 42 positioned on the track 12, one of the at least two cameras 16, the first wing 18, or the second wing 20, generating a single high-quality image that is level and plumb. In certain inventive embodiments, the single high-quality image is also a wide-frame single image.

It is appreciated that in some inventive embodiments the wide-frame single image is generated by stitching together data from the plurality of images. It is further appreciated that by stitching together data from the plurality of images, the lighting of each image stitched can be independently adjusted, thereby reducing or eliminating unwanted reflections and glare in the resultant high-quality image. It is still further appreciated that by stitching together data from the plurality of images, the resultant high-quality image is a wider-angle view with less distortion when compared to prior art images captured with a standard wide lens camera.

In other inventive embodiments, a stereoscopic three-dimensional image is generated based on the set of image data from the plurality of images captured. In some inventive embodiments, the at least two cameras 16 is more than two cameras and a stereoscopic three-dimensional image is generated based on the set of image data from the plurality of images captured from the more than two cameras. It is appreciated that in some inventive embodiments a set three-dimensional surface data of various vehicle features is generated based on the set of image data from the plurality of images captured. It is further appreciated that in other inventive embodiments, the set of three-dimensional surface data includes surface detail information of various vehicle features captured illustratively including, material, color, texture, stitching, and contour.

In some inventive embodiments, the at least two cameras 16 is two cameras and the at least two light sources 22 is two lights sources. It is appreciated that one of the two light sources 22 is fired and a first image is captured with one of the two cameras 16, and then the other of the two light sources 22 is fired and a second image is captured with the other of the two cameras 16. It is further appreciated that by firing one of the two light sources 22 and capturing a first image with one of the two cameras 16 that is positioned opposite the one of the two light sources 22, and then firing the other of the two light sources 22 and capturing a second image with the other of the two cameras 16 that is positioned opposite the second of the two light sources 22, two sets of image data from a vehicle feature are generated, each set being partially reflection-free and partially glare-free. It is further appreciated that when these two sets of image data are composited in a single image, the single image is high-quality, reflection-free, and glare-free.

In some inventive embodiments, images and related image data captured by the inventive photographic paddle 10 or 10' are transferred to another device, such as a computer for further processing and final generation of high-quality, reflection-free, and glare-free images as illustrated in FIG. 5. In certain inventive embodiments, at least one of the image data generated from the plurality of images captured, the set of accelerometer generated data, the set of ambient lighting conditions data, the set of distance data, the single image composite, and combinations thereof are transferred via the communication interface 44 having one or more of wired and wireless links, optical drives, universal serial bus (USB), flash memory slot, and combinations thereof. In some inventive embodiments, the shutter release 26 is remotely and wirelessly actuated via the communication interface 44.

References cited herein are indicative of the level of skill in the art to which the invention pertains. These references are hereby incorporated by reference to the same extent as if each individual reference was specifically and individually incorporated by reference herein.

As a person skilled in the art will recognize from the previous detailed description and from the figures and claims, modifications and changes can be made to the preferred embodiments of the invention without departing from the scope of this invention defined in the following claims. The foregoing description is illustrative of particular embodiments of the invention but is not meant to be a limitation upon the practice thereof, and no limitation with respect to the particular embodiments is intended nor should be inferred. The following claims, including all equivalents thereof, are intended to define the scope of the invention.

The invention claimed is:

1. A photographic apparatus comprising:
a track comprising a shutter release mechanism;
a face slidably coupled to the track and comprising at least one camera; and
a first wing slidably coupled to the track, located proximate to a first end of the face, and comprising a first light source,
wherein actuation of the shutter release mechanism causes the at least one camera to capture at least one image and the first light source to fire.

2. The photographic apparatus of claim 1, wherein:
the photographic apparatus further comprises a second wing slidably coupled to the track, located proximate to a second end of the face, and comprising a second light source;
the first end of the face is located on an opposite side of the face from the second end of the face; and
the actuation of the shutter release mechanism further causes the second light source to fire.

3. The photographic apparatus of claim 2, wherein the firing of the first light source uses a different timing than the firing of the second light source.

4. The photographic apparatus of claim 1, wherein an angle of the first wing relative to the face and the track is adjustable.

5. The photographic apparatus of claim 1, wherein the face further comprises an accelerometer configured to gather accelerometer data for the photographic apparatus, and wherein the accelerometer data is used to tune the at least one image so that the at least one image is at least one of level or plumb.

6. The photographic apparatus of claim 1, further comprising a distance detector coupled to the track, the face, or the first wing, wherein the distance detector is configured to gather distance data, and wherein the distance data is used to tune the at least one image so that the at least one image is at least one of reflection-free or glare-free.

7. The photographic apparatus of claim 1, wherein the face further comprises an accordion extension coupled to the at least one camera, and wherein the accordion extension allows the at least one camera to pan and tilt.

8. A method for manufacturing a photographic apparatus, the method comprising:
sliding a face comprising at least one camera onto a track comprising a shutter release mechanism; and
sliding a first wing comprising a first light source onto the track such that the first wing is proximate to a first end of the face, wherein actuation of the shutter release mechanism causes the at least one camera to capture at least one image and the first light source to fire.

9. The method of claim 8, further comprising, after the face is slid and the first wing is slid, sliding a second wing comprising a second light source onto the track such that the second wing is proximate to a second end of the face, wherein the first end of the face is located on an opposite side of the face from the second end of the face and the actuation of the shutter release mechanism further causes the second light source to fire.

10. The method of claim 9, wherein the firing of the first light source uses a different timing than the firing of the second light source.

11. The method of claim 8, wherein an angle of the first wing relative to the face and the track is adjustable.

12. The method of claim 8, wherein the face further comprises an accelerometer configured to gather accelerometer data for the photographic apparatus and the accelerometer data is used to tune the at least one image so that the at least one image is at least one of level or plumb.

13. The method of claim 8, further comprising coupling a distance detector to the track, the face, or the first wing, wherein the distance detector is configured to gather distance data for the photographic apparatus and the distance data is used to tune the at least one image so that the at least one image is at least one of reflection-free or glare-free.

14. The method of claim 8, further comprising coupling an accordion extension to the at least one camera, wherein the accordion extension allows the at least one camera to pan and tilt.

15. A method of using a photographic apparatus, the method comprising:
inserting at least a portion of the photographic apparatus into a cab of a vehicle,
wherein the photographic apparatus comprises:
a track comprising a shutter release mechanism;
a face slidably coupled to the track and comprising at least one camera; and
a first wing slidably coupled to the track, located proximate to a first end of the face, and comprising a first light source;
actuating the shutter release mechanism;
in response to actuating the shutter release mechanism, firing the first light source; and capturing at least one image of the cab of the vehicle with the at least one camera.

16. The method of claim 15, wherein:

the photographic apparatus further comprises a second wing slidably coupled to the track, located proximate to a second end of the face, and comprising a second light source;

the first end of the face is located on an opposite side of the face from the second end of the face; and the method further comprises, in response to actuating the shutter release mechanism, firing the second light source.

17. The method of claim 16, wherein the firing of the first light source uses a different timing than the firing of the second light source.

18. The method of claim 15 further comprising, prior to actuating the shutter release mechanism, adjusting an angle of the first wing relative to the track and relative to the face.

19. The method of claim 15 further comprising gathering accelerometer data for the photographic apparatus; and tuning the at least one image using the accelerometer data so that the at least one image is at least one of level or plumb.

20. The method of claim 15 further comprising:

gathering distance data for the photographic apparatus; and tuning the at least one image using the distance data so that the at least one image is reflection-free and glare-free.

*    *    *    *    *